W. E. NELSON.
MOLDING APPARATUS.
APPLICATION FILED MAY 12, 1919.
1,335,254.
Patented Mar. 30, 1920.
2 SHEETS—SHEET 1.
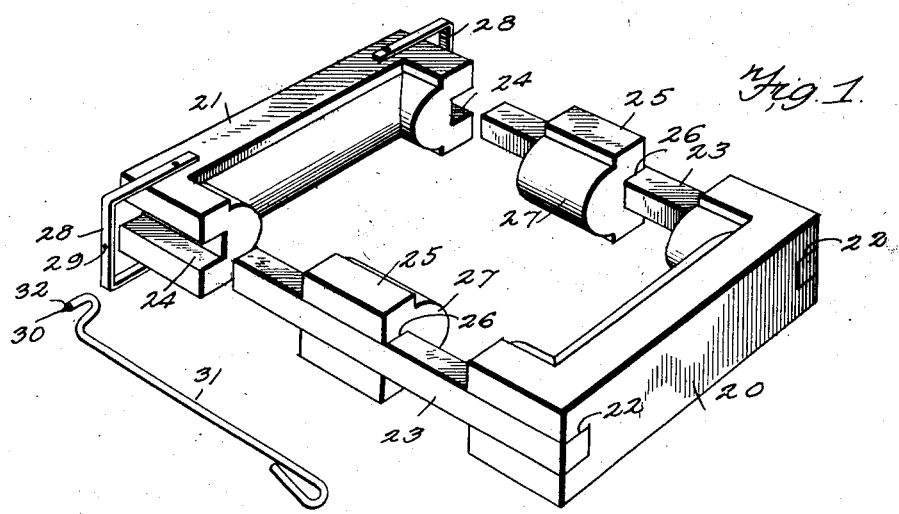
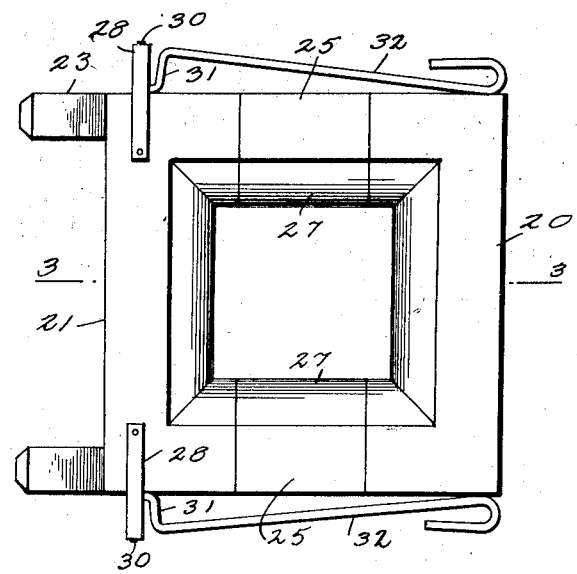
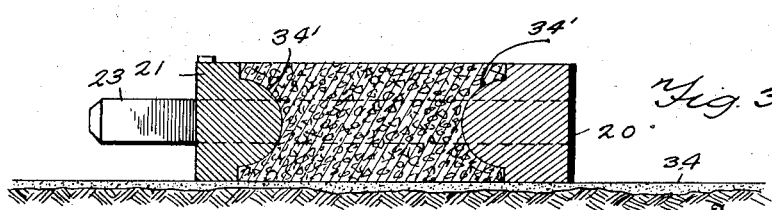
Inventor
William E. Nelson,
By
Attorney

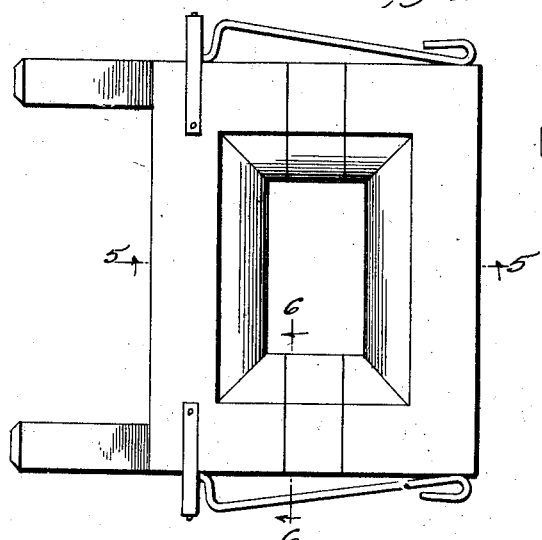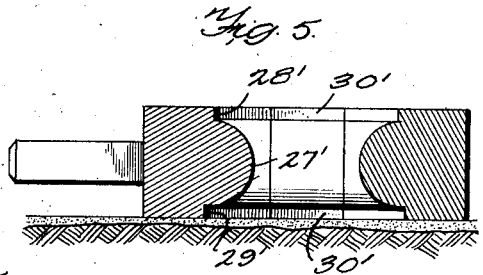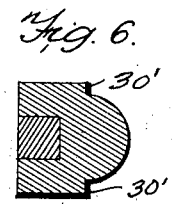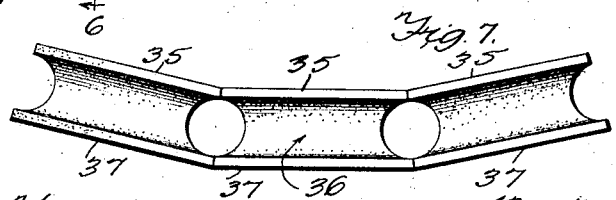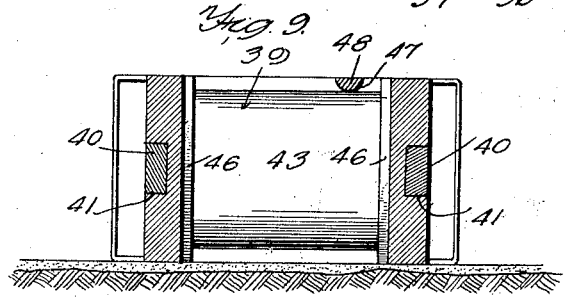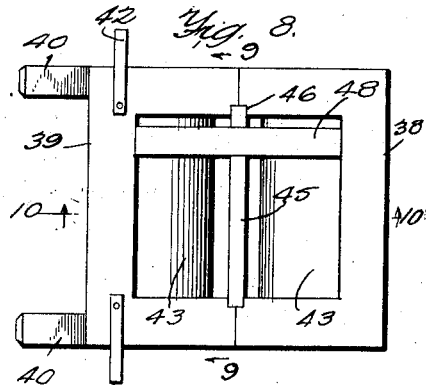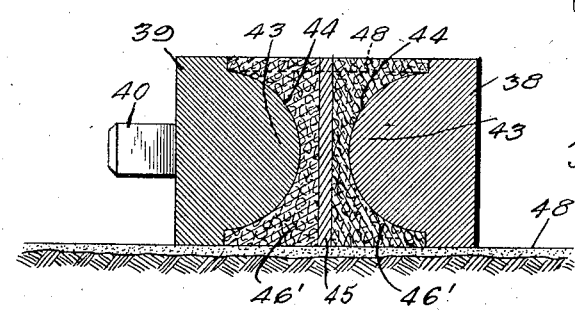

UNITED STATES PATENT OFFICE.

WILLIAM E. NELSON, OF FORT WORTH, TEXAS.

MOLDING APPARATUS.

1,335,254.  Specification of Letters Patent. Patented Mar. 30, 1920.

Application filed May 12, 1919. Serial No. 296,596.

*To all whom it may concern:*

Be it known that I, WILLIAM E. NELSON, a citizen of the United States, residing at Fort Worth, in the county of Tarrant and State of Texas, have invented certain new and useful Improvements in Molding Apparatus, of which the following is a specification.

My invention relates to improvements in molding apparatus for producing concrete blocks or the like which are adapted to be assembled and formed into a monolithic structure.

An important object of the invention is to provide apparatus of the above mentioned character, which is cheap to manufacture, strong and durable.

A further object of the invention is to provide apparatus of the above-mentioned character which is adjustable for forming blocks of different sizes.

Other objects and advantages of the invention will be apparent during the course of the following description.

In the accompanying drawings forming a part of this specification and in which like numerals are employed to designate like parts throughout the same:

Figure 1 is a perspective view of a mold apparatus, embodying my invention, parts being shown separated;

Fig. 2 is a plan view of the same, parts being assembled;

Fig. 3 is a vertical longitudinal sectional view through the apparatus, showing the same filled with the concrete, illustrating its mode of operation;

Fig. 4 is a plan view of a slightly different form of mold apparatus employed to produce blocks forming a curved structure;

Fig. 5 is a longitudinal sectional view, taken on line 5—5 of Fig. 4;

Fig. 6 is a transverse section, taken on line 6—6 of Fig. 4;

Fig. 7 is a plan view of a plurality of blocks arranged to produce a curved structure or wall;

Fig. 8 is a plan view of a further different form of apparatus embodying the invention for molding column or floor beam blocks;

Fig. 9 is a transverse sectional view, taken on line 9—9 of Fig. 8; and,

Fig. 10 is a longitudinal sectional view, taken on line 10—10 of Fig. 9.

In the drawings, wherein for the purpose of illustration, is shown a preferred embodiment of my invention, attention being called first to Figs. 1 to 3 inclusive, the mold apparatus is shown as comprising approximately U-shaped end-members 20 and 21. The end-member 20 is relatively stationary, and is provided upon its ends with transverse grooves 22, receiving guide bars 23, which are fixedly held therein by any suitable means. These guide bars extend longitudinally of the mold apparatus and are adapted to be slidably mounted within the grooves 24, formed in the ends of the adjustable end-member 21.

Adapted to be arranged between the end-members 20 and 21 are filler-sections 25, which may be of any suitable length, depending upon the length of the block which it is desired to form, it being understood that these filler-sections are removable so that other filler sections of the desired length may be employed. Each filler-section is provided upon its outer side with a groove 26 slidably receiving the guide bar 23. In Fig. 2, the elements of the mold are shown in the inner or assembled position, and the end-members and filler-sections 25 are provided upon their inner sides with projections 27, forming in effect a continuous rectangular flange. These projections are shown as being substantially semi-circular in cross section, it being understood that the invention is in no sense restricted to any particular shape of the projections.

The adjustable end-member 21 is provided with U-shaped brackets 28, rigidly secured thereto, these brackets being provided with openings 29, to loosely receive a reduced end 30 formed upon a clamping member 31, providing a shoulder 32. This clamping member is carried upon one end of a lever 33, as shown. When the ends 30 are passed through the openings 29 and the levers 23 are swung inwardly, as illustrated in Fig. 2, the members 31 clamp against the bars 23, thereby locking the adjustable end-member against movement.

As clearly shown in Fig. 3, the top and bottom of the mold apparatus is entirely open and such apparatus only forms the sides and ends of the block. The apparatus is placed upon a covering 34 of sand or the like which may be placed upon the ground. The mold apparatus is then filled with fluid or plastic concrete, the upper face of the block being formed by floating off the excess concrete. The apparatus is allowed to remain in this condition long enough for the block to be sufficiently hardened to permit of the separation of the parts of the mold and the removal of the block.

The flanges 27 provide recesses 34', formed around the four edges of the molded block. These recesses receive the concrete or the like, which when the blocks are assembled convert the same into a monolithic structure. This monolithic structure forms the subject-matter of a separate application, and is not shown nor described in detail in the present application.

In Figs. 4 to 6 inclusive, a slightly different form of apparatus is provided, for producing blocks employed in building circular structures. In this form of apparatus, the only change consists of altering the shape of the extension or flange 27 carried by the longitudinal portions of the end-members 20 and 21. As clearly shown in Fig. 5, the extension 27' has its upper shoulder 28', projecting inwardly for a substantial distance beyond the lower shoulder 29'. As shown in Fig. 6, the shoulders 30' are disposed in the same plane, as shown and described in connection with the first form of the invention. As a result of this change in the mold apparatus the inner faces 35 of the blocks 36 produced by the apparatus are shorter than the outer faces 37, whereby the several blocks may be assembled in a slightly angular relation producing the curved construction. All the parts of the apparatus are identical with those shown and described in the apparatus shown in Figs. 1 and 2 inclusive.

In Figs. 8 to 10 inclusive, I have shown a further different form of mold apparatus, adapted to form blocks, to be used in producing columns, floor beams and the like. This apparatus comprises substantially U-shaped end members 38 and 39. The end member 39 carries guide bars 40 rigidly secured thereto, adapted to be slidably mounted in grooves 41, formed in the end member 38.

U-shaped brackets 42, similar to the brackets 28, are secured to the end member 39 and the same clamping elements 33 engage these brackets 42 and serve to lock the end member 39 to the bars 40.

The end members 38 and 39 are provided with transverse fillers 43, preferably formed integral with the transverse portions of the U-shaped end members. These fillers have transversely curved inner faces 44, as shown. The numeral 45 designates a partition plate, the ends of which are adapted for insertion within grooves 46, formed in the ends of the longitudinal arms of the U-shaped end members. At its upper end, this partition plate has a recess 47 formed therein, receiving a core member 48, adapted to form an opening or notch in the molded block for the passage of the reinforcing rod or the like.

This apparatus is adapted to be placed upon a facing 48 of sand or the like and filled with liquid or plastic concrete, the top of the mass being floated off. As illustrated in Fig. 10, the apparatus produces two blocks 46 having one straight edge or face while its opposite face is concaved. These blocks are adapted to be assembled for forming a column or floor beams.

It is to be understood that the forms of my invention herein shown and described are to be taken as the preferred examples of the same, and that various changes in the shape, size, and arrangement of parts may be resorted to without departing from the spirit of the invention or the scope of the subjoined claims.

Having thus described my invention, I claim:

1. In molding apparatus of the character described, an end-member, guide bars carried by the end-member, a coacting end-member adjustably mounted upon the guide bars, and filler-sections adapted to be arranged between the end-members and to engage with the guide bars.

2. In molding apparatus of the character described, an end-member, guide bars carried by the end-member, a coacting end-member provided with grooves to receive the guide bars, and filler-sections adapted to be arranged between the end-members and having grooves for receiving the guide bars.

3. In molding apparatus of the character described, an end-member provided upon its inner side with an inwardly projecting extension, guide bars secured to the end-member, a coacting end-member provided upon its inner side with an inwardly extending projection and having longitudinal grooves for receiving the guide bars, and means to hold the adjustable end-member in the closed position.

4. In molding apparatus of the character described, an end-member provided upon its inner side with an inwardly projecting extension, guide bars secured to the end-member, a coacting end-member provided upon its inner side with inwardly extending projections and provided upon its outer side with grooves to receive the guide bar, and clamping elements carried by the coacting end-member to engage with the guide bars.

In testimony whereof I affix my signature in presence of two witnesses.

WILLIAM E. NELSON.

Witnesses:
 FRED M. HAMMOND,
 W. C. TIMMONS.